W. J. AND E. J. HOOD.
MAGNETIC SCREWDRIVER.
APPLICATION FILED APR. 26, 1920.

1,378,032.

Patented May 17, 1921.

INVENTORS
William J. Hood,
Eugene J. Hood
by
Owen, Owen & Crampton.

UNITED STATES PATENT OFFICE.

WILLIAM J. HOOD AND EUGENE J. HOOD, OF TOLEDO, OHIO.

MAGNETIC SCREWDRIVER.

1,378,032.            Specification of Letters Patent.    Patented May 17, 1921.

Application filed April 26, 1920. Serial No. 376,490.

*To all whom it may concern:*

Be it known that we, WILLIAM J. HOOD and EUGENE J. HOOD, citizens of the United States, and residents of Toledo, Lucas county, Ohio, have made an invention appertaining to Magnetic Screwdrivers; and we do hereby declare the following to be a full, clear, and exact description of the invention, such as will enable others skilled in the art to which it appertains to make and use the same, reference being had to the accompanying drawings, and the characters of reference marked thereon, which form a part of this specification.

Our invention has for its object to provide a simple means whereby a screw may be held on the end of a screw driver just before and while it is being started in the operation of screwing the screw into an object. The invention particularly has for its object to provide a means whereby a screw may be conveniently handled. By our invention is provided a means whereby the screws operated upon by the screw driver may be manipulated with the hand that holds the screw driver and without the use of the other hand of the operator, which leaves the said other hand free to hold, if desired, any object to be secured by the screw.

The invention may be contained in screw drivers of different forms. For purpose of illustration we have selected a driver containing the invention and shall describe it hereinafter. The screw driver selected is illustrated in the accompanying drawings.

Figure 1:
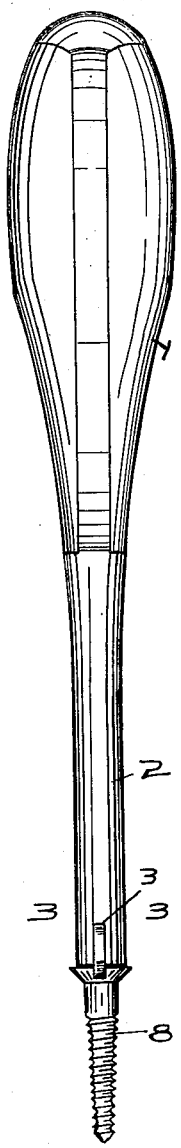
Figure 2:
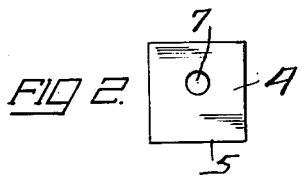
Figure 3:
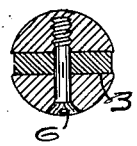

Figure 1 of the drawings illustrates a screw driver containing our invention. Fig. 2 illustrates a side view of an insert that is used for engaging the screw to produce rotation thereof. Fig. 3 is a sectional view showing the manner of securing the insert in position.

1, Fig. 1, is the handle of the screw driver, 2 is a shank that may be secured in the handle. The shank is formed of steel, preferably hardened steel so that it may be permanently magnetized.

The lower end of the shank 2 is provided with shoulders that present surfaces located at right angles to the axis of the shank and so that when the flat top of the screw is brought into contact with the end of the magnetized shank 2, will hold the screw in axial alinement with the shank. The lower end of the shank may be provided with a projection that extends into the slot or the channel formed in the head of the screws for engaging the screw to rotate it.

In the form of the invention shown, the lower end of the magnetized shank 2 is cut off at right angles to the axis of the shank and is provided with a slot 3 in which is located an insert 4. The lower end 5 of the insert 4 protrudes a short distance from the end of the shank 2. The insert 4 is secured in the shank by means of the screw 6 that passes through an opening 7 formed in the shank and threads into one part of the split end of the shank. When the screw is threaded into the shank it operates to clamp the insert 4 between the portions of the split end of the shank.

The insert 4 may be formed of steel or it may be formed of any non-magnetic metal. It is, however, preferably so located that its lower end 5 does not protrude more than the depth of the channel of the screw. This prevents tilting of the screw when the lower end of the insert is inserted into the channel or slot formed in the head of the screw. The insert is preferably made removable in order that it may be readily shaped in case the corners are worn by reason of the use of the screw driver. If desired, inserts of different size may be secured in position in the screw driver.

It is to be understood that although we have selected a simple form of screw driver to illustrate an embodiment of our invention, yet it may be embodied in more or less complicated, such as semi-automatic screw drivers well known in the art.

We claim:—

1. In a screw driver a magnetized shank, the end of the shank having a surface extending at right angles to the axis of the shank, and having an insert of metal protruding from the end of the shank a distance not over the depth of the channel of the head of the screw, and means for clamping the insert in position in the end of the shank.

2. In a screw driver a magnetized shank, the end of the shank having a surface extending at right angles to the axis of the shank, and having an insert of non-magnetic metal protruding from the end of the shank a distance not over the depth of the channel of the head of the screw, and means for clamping the insert in position in the end of the shank.

In testimony whereof we have hereunto signed our names to this specification.

WILLIAM J. HOOD.
EUGENE J. HOOD.